United States Patent [19]
Hall

[11] Patent Number: 5,886,499
[45] Date of Patent: Mar. 23, 1999

[54] LIFE EXTENDING OPERATIONAL REGIME FOR BATTERY

[75] Inventor: John C. Hall, Saratoga, Calif.

[73] Assignee: Space Systems/Loral, Inc., Palo Alto, Calif.

[21] Appl. No.: 927,750

[22] Filed: Sep. 11, 1997

[51] Int. Cl.$^6$ .................................................. H01M 10/44
[52] U.S. Cl. ........................ 320/101; 320/132; 320/136; 136/292
[58] Field of Search ..................................... 320/101, 123, 320/125, 132, 134, 136, 160, 163, 111, 118, 129, 138; 136/243, 291, 292

[56] References Cited

U.S. PATENT DOCUMENTS

| | | | |
|---|---|---|---|
| 4,820,597 | 4/1989 | Lim et al. | 429/50 |
| 5,617,006 | 4/1997 | Lenhart et al. | 320/136 X |
| 5,698,964 | 12/1997 | Kates et al. | 320/164 |

*Primary Examiner*—Edward H. Tso
*Attorney, Agent, or Firm*—Perman & Green, LLP

[57] ABSTRACT

A method of operating a battery, for example, in a geosynchronous spacecraft is presented for maximizing its service life. According to this method, the energy requirements are determined, specifically those to be satisfied by the battery at a plurality of incremental events over a predetermined operating period as when the spacecraft is in the shadow of the earth. Then, the battery is maintained at a state of charge at least sufficient to satisfy the sum of (i) the energy requirements of the battery at each of the plurality of incremental events and (ii) an energy reserve for the battery in the event of a malfunction of the spacecraft. The charge capacity of the battery is preferably adjusted in a stepwise fashion in accordance with its predetermined energy requirements. By utilizing the invention, the battery is maintained at a full state of charge for less than approximately half of the earlier mentioned predetermined operating period such that the service life of the battery is enhanced.

11 Claims, 1 Drawing Sheet

LIFE EXTENDING OPERATIONAL REGIME FOR BATTERY

BACKGROUND OF THE INVENTION

1. Field of the Invention

The present invention relates generally to the operation of batteries and, more specifically, to the manner of recharging batteries such as those used in spacecraft applications. The invention serves to extend the service life of batteries, especially those employed for powering long life geosynchronous spacecraft or in other instances in which there is a high degree of predictability about the operation of a battery.

2. Description of the Prior Art

Lithium ion batteries which are desirable for use in powering many spacecraft systems typically recharge with voltages between 3.0 and 4.5 volts. Battery voltage increases as the state of charge of the battery is increased. Thus the more charge stored in the battery, the higher its recharge voltage. High voltages can lead to parasitic reactions at both the positive and negative electrodes. Typical positive electrodes for lithium ion batteries are metal oxides such as $CoO_2$, $NiO_2$, and $MnO_2$, As the voltage of these metal oxides is increased their thermodynamic stability versus oxygen decomposition, e.g.,

$$M_xO_y \rightarrow M_xO_{y-2} + O_2 \tag{1}$$

decreases. In addition recharge of the positive electrode to higher voltages increases its power as an oxidizing agent. Electrolyte in contact with the positive electrode is thus more likely to be destructively oxidized by the positive electrode. An example of such a reaction in aqueous batteries is the electrolysis of water at a nickel electrode during recharge. In the aqueous example the reaction is reversible and is not believed to strongly effect battery life. In a non-aqueous battery employing organic electrolytes a similar oxidation reaction is irreversible and will shorten the battery life.

Similarly, during recharge of the negative electrode, it becomes a stronger reducing agent as its state of charge is increased. As it is also in contact with the non-aqueous electrolyte, the tendency of the electrolyte in contact with the negative electrode to be irreversibly reduced increases. This problem is further exacerbated in lithium ion battery where the carbon or graphite lithium negative electrode may as the state of charge increases approach the voltage of lithium metal. In this case during recharge lithium metal may be deposited on the surface of the carbon based electrode which in turn will lead to a direct and irreversible reaction between lithium metal and the non-aqueous electrolyte.

It was with knowledge of the foregoing that the present invention has been conceived and is now reduced to practice.

SUMMARY OF THE INVENTION

The present invention relates to a method of operating a battery, for example, in a geosynchronous spacecraft in such a manner as to maximize its service life. According to this method, the energy requirements are determined, specifically those to be satisfied by the battery at a plurality of incremental events over a predetermined operating period as when the spacecraft is in the shadow of the earth. Then, the battery is maintained at a state of charge at least sufficient to satisfy the sum of (i) the energy requirements of the battery at each of the plurality of incremental events and (ii) an energy reserve for the battery in the event of a malfunction of the spacecraft. The charge capacity of the battery is preferably adjusted in a stepwise fashion in accordance with its predetermined energy requirements. By utilizing the invention, the battery is maintained at a full state of charge for less than approximately half of the earlier mentioned predetermined operating period such that the service life of the battery is enhanced.

Prior art practices typically call for fully recharging batteries after use. This invention recognizes that in geosynchronous use, for example, the future required discharge capacity is known. By recharging to meet future discharge demand parasitic recharge reactions are reduced. The invention extends battery charge-discharge life minimizing exposure of battery components to high charging voltages, it being generally true that destructive side reactions are promoted by high voltage battery operation.

A primary feature of the invention, then, is to provide a method of operating batteries in a manner which extends their service life.

Another feature of the invention is to provide such a method of operating batteries for which there is a high degree of predictability about their operation.

Still another feature of the invention is to provide such a method of operating batteries which are used in spacecraft applications.

A further feature of the invention is to provide such a method of operating batteries which are employed for powering long life geosynchronous spacecraft. Yet a further feature of the invention is to provide such a method of operating batteries which serves to increase the service life of lithium ion batteries, for example, in geosynchronous service by maintaining the battery in a partial as opposed to full state of charge during solstice periods when its energy storage function is not routinely required, the actual state of charge of the battery being determined by the energy reserve requirements needed in case of failure of the spacecraft attitude control system.

Yet another feature of the invention is to provide such a method of operating batteries so as to increase battery life in those instances where the future capacity storage requirement is known by only charging the battery to the capacity it will be required to have in the upcoming discharge cycle.

Still a further feature of the invention is to provide such a method of operating batteries which entails only recharging a geosynchronous spacecraft battery to the extent required to support the next eclipse discharge plus an attitude control failure reserve.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

As discussed above, it is anticipated that the cycle and service life of a battery, such as a lithium ion battery, will be enhanced by reducing its state of charge. This in turn, however, reduces the energy storage of the battery and in general would be an unacceptable solution. Geosynchronous spacecraft operation is an application where (a) the battery is only required to deliver full capacity for a limited fraction of its duty cycles and (b) the occurrence of and required capacity for each battery duty cycle known.

Figure 1:
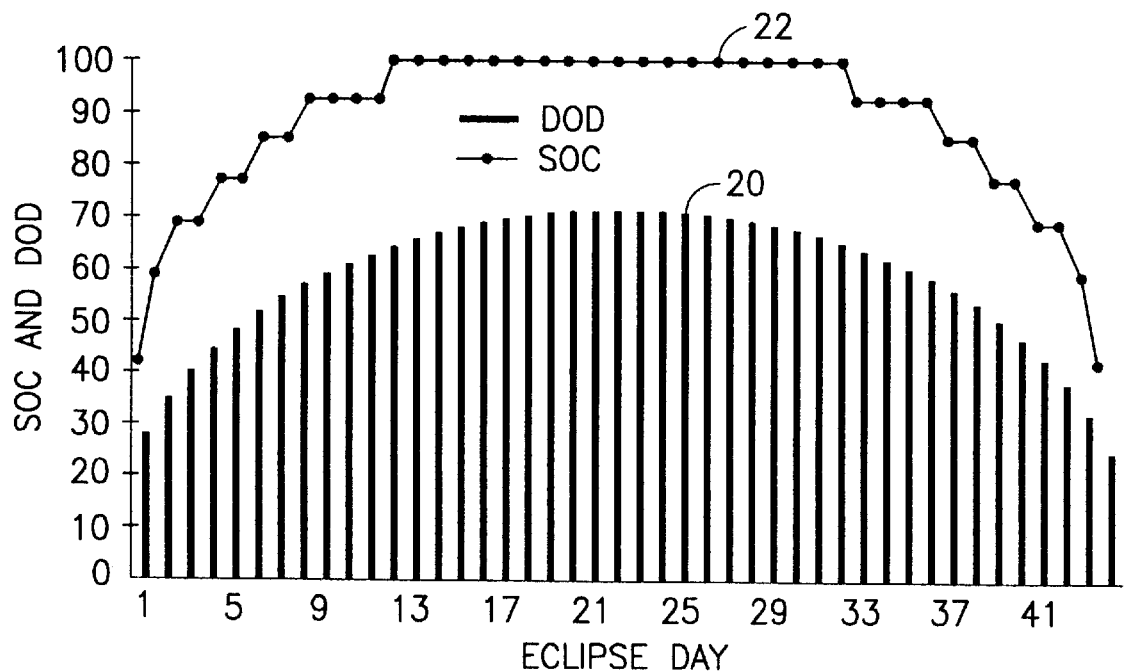
FIG. 1 is a graph displaying state of charge and depth of charge requirements for the eclipse operation of a battery according to the invention.

As Illustrated in FIG. 1, a typical eclipse season comprises 44 discharge or duty cycles 20 typically between ~40% and ~80% of the depth of discharge (DOD) of the battery. These discharge or duty cycles occur twice yearly at the spring and autumnal equinoxes. During these equinox periods, the power producing solar arrays of the spacecraft are shadowed by the earth on a daily basis. The battery provides power to the spacecraft when the primary solar power is unavailable. There is literally a celestial predictability to the occurrence and extent of battery discharge.

This predictability presents an opportunity to control the state of charge of the battery based on the upcoming discharge energy storage requirement. In FIG. 1, this is illustrated by the state of charge (SOC) line 22 where the charge capacity of the battery is increased in a stepwise fashion as the required energy storage increases.

Practically, with a lithium ion battery, this operation would be implemented with a battery charge monitor. During periods of non-use, the battery would be maintained at a state of charge sufficient to provide whatever emergency power reserve the spacecraft requires. Such reserves are required in the event that the attitude control system on the spacecraft malfunctions and the solar array is not pointed at the sun. For advanced high power spacecraft, this emergency energy reserve requirement is much less than the maximum energy storage capability of the battery as the critical non payload loads of the spacecraft do not increase linearly with payload size and the spacecraft payload is shed in the event of a loss of attitude control.

During periods of use (e.g., eclipse operation), the state of charge of the battery is increased as shown in FIG. 1 to meet the impending discharge energy storage requirements. The example pattern in FIG. 1 assures that a constant reserve capacity is always present in the battery in the event, for example, of an attitude control failure. However, rather than provide an excessive reserve capacity during periods of shallow discharge, a battery operated according to the invention is provided additional service life by not being fully recharged.

The net result of the invention is that in a 20 year spacecraft a battery which is required to support more than 1,700 discharge cycles, less than half the cycles will be to a full state of charge. This fact, combined with partial charge storage, creates substantially less stress on the on the battery and extends battery life by, in effect, not overusing the battery.

Figure 2:
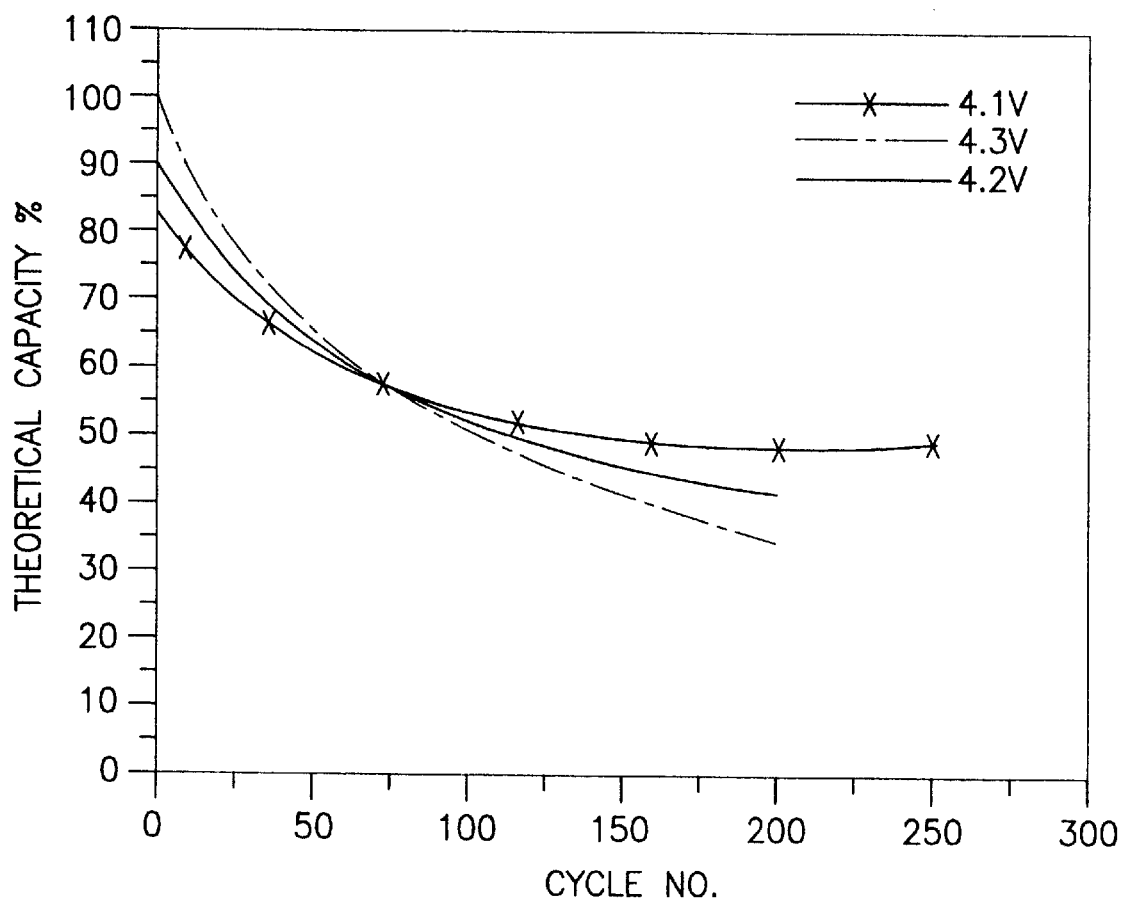
FIG. 2 is a graph displaying, over time, the theoretical capacities of batteries of different voltages charged, respectively, to different initial capacities.

A typical prior art scenario is presented in FIG. 2 which depicts, over time, the theoretical capacities of batteries of different voltages charged, respectively, to different initial capacities. The 4.1 V battery was initially charged to approximately 83% of capacity but retains approximately 50% of capacity after 200 cycles of operation. The 4.2 V battery was initially charged to approximately 90% of capacity but only retains approximately 43% of capacity after 200 cycles of operation. The 4.3 V battery was initially charged to approximately 100% of capacity but only retains approximately 36% of capacity after 200 cycles of operation. If one were in need of a 4.3 V output but sought to maximize charge capacity after many cycles, it would conventionally be necessary to increase battery size by approximately 30% to assure retention of approximately 50% of capacity after 200 cycles. Alternatively, he might have to accept a 4.1 V output to assure retention of approximately 50% of capacity after 200 cycles. In contrast, the present invention envisions building a 4.3 V battery 15% bigger but only charging to the capacity actually required to satisfy the sum of the energy requirements of the battery at each of a plurality of incremental events during the discharge cycle and at the same time provide an energy reserve for the battery. Thus, by recharging the battery to a higher voltage only when required, a higher net capacity can be achieved after extended use than when always recharging to the maximum voltage.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of operating a battery so as to maximize its service life comprising the steps of:
   (a) determining the energy requirements to be satisfied by the battery at a plurality of incremental events over a predetermined operating period; and
   (b) during periods of use, maintaining the battery at a state of charge sufficient to satisfy at least the energy requirements of the battery at each of the plurality of incremental events.

2. A method of operating a battery as set forth in claim 1 wherein step (b) includes the step of:
   (c) maintaining the battery at a state of charge at least sufficient to satisfy the sum of (i) the energy requirements of the battery at each of the plurality of incremental events and (ii) an energy reserve for the battery.

3. A method of operating a battery as set forth in claim 1 wherein step (b) includes the step of:
   (c) adjusting the charge capacity of the battery in a stepwise fashion in accordance with the predetermined energy requirements of the battery.

4. A method of operating a battery as set forth in claim 3 wherein step (c) includes the step of:
   (d) maintaining the battery at a full state of charge for less than approximately half of the predetermined operating period of step (a).

5. A method of operating a battery as set forth in claim 1 wherein step (b) includes the step of:
   (c) during periods of non-use when the spacecraft is exposed to the sun, maintaining an energy reserve for the battery in the event of a malfunction of the spacecraft.

6. A method of operating a battery whose intended operation is predictable so as to maximize its service life comprising the steps of:
   (a) determining the energy requirements to be satisfied by the battery at a plurality of incremental events over a predetermined operating period when the spacecraft is in the shadow of the earth; and (b) during periods of use, when the spacecraft is exposed to the sun, maintaining the battery at a state of charge sufficient to satisfy at least the energy requirements of the battery at each of the plurality of incremental events.

7. A method of operating a battery as set forth in claim 6 wherein step (b) includes the step of:

(c) maintaining the battery at a state of charge at least sufficient to satisfy the sum of (i) the energy requirements of the battery at each of the plurality of incremental events and (ii) an energy reserve for the battery in the event of a malfunction of the spacecraft.

8. A method of operating a battery as set forth in claim 6 wherein step (b) includes the step of:

(c) adjusting the charge capacity of the battery in a stepwise fashion in accordance with the predetermined energy requirements of the battery.

9. A method of operating a battery as set forth in claim 6 wherein step (c) includes the step of:

(d) maintaining the battery at a full state of charge for less than approximately half of the predetermined operating period of step (a).

10. A method of operating a battery as set forth in claim 6 wherein step (b) includes the step of:

(c) during periods of non-use when the spacecraft is exposed to the sun, maintaining a minimum energy reserve for the battery in the event of a malfunction of the spacecraft.

11. A method of operating a battery as set forth in claim 6 wherein the battery is intended to be used in a geosynchronous spacecraft.

* * * * *